(No Model.)
T. M. BAKER.
Medicine Spoon.
No. 233,185.  Patented Oct. 12, 1880.
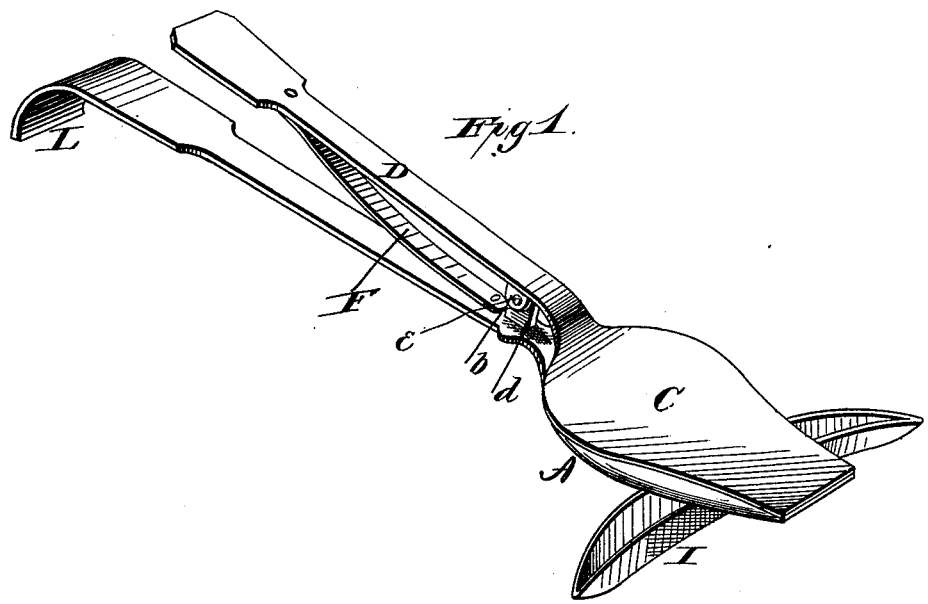
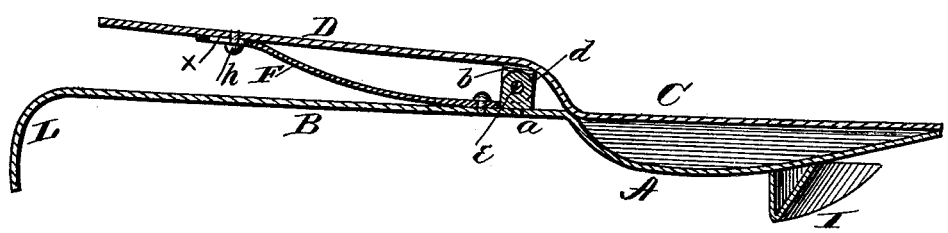
Witnesses:
Franck L. Ouraud
H. Aubrey Toulmin
Thomas M. Baker,
Inventor.
By Alexander Mason
atty

UNITED STATES PATENT OFFICE.

THOMAS M. BAKER, OF WASHINGTON, DISTRICT OF COLUMBIA.

MEDICINE-SPOON.

SPECIFICATION forming part of Letters Patent No. 233,185, dated October 12, 1880.

Application filed July 6, 1880. (No model.)

*To all whom it may concern:*

Be it known that I, THOMAS M. BAKER, of Washington, in the county of Washington, and in the District of Columbia, have invented certain new and useful Improvements in Medicine-Spoons; and I do hereby declare that the following is a full, clear, and exact description thereof, reference being had to the accompanying drawings, and to the letters of reference marked thereon, making a part of this specification.

My invention relates to spoons for taking or administering medicine; and it consists in the peculiar construction and arrangement of parts, as will be hereinafter more fully set forth, and pointed out in the claims.

In order to enable others skilled in the art to which my invention appertains to make and use the same, I will now proceed to describe its construction and operation, referring to the annexed drawings, in which—

Figure 1 is a perspective view of my medicine-spoon. Fig. 2 is a longitudinal section of the same.

A represents the bowl, and B the handle, of a spoon of any suitable size. The edge of the bowl A is made vertical for a short distance all around, as shown at $a$, so as to insure a tight joint when the cover C is brought over the same, said cover being of such size as to fit the bowl completely. The cover C is also provided with a handle, D, from a suitable point upon which project downward two side lugs, $b\ b$. These lugs may be struck up from the same piece of metal or other material from which the cover and its handle are made, or they may be attached to said handle in any convenient manner.

The lugs $b\ b$ straddle another lug, $d$, which is swiveled on top of the spoon-handle B, and pivoted to said lug $d$ by a pin, bolt, or rivet, $e$.

Back of the swiveled lug $d$, on the spoon-handle B, is pivoted one end of a spring, F, which extends rearward and upward and has its other end provided with a longitudinal slot, $x$. Through this slot is passed a rivet or pin, $h$, secured in the cover-handle D, as shown.

The action of the spring F is to hold the cover C down tightly on the bowl A, and, by pressing down upon the cover-handle D, the end of the cover is raised sufficiently to allow the medicine in the bowl to pass out. At the same time the swiveled lug $d$ and the peculiar construction of the spring F and its connection with the spoon and cover handles admit of the cover being turned to either side, so as to uncover the spoon and allow of the medicine being poured into the spoon.

The bowl of the spoon is to be graduated in such a manner that any desired quantity may be poured out.

On the under side of the bowl is attached a curved cup, I, which is V-shaped in its cross-section, and which forms a stop to prevent the spoon from being inserted too far into the mouth of infants or children. This cup at the same time serves two other important purposes. It is well known that when medicine is administered to children they will very often attempt to spit it out. When this is done the medicine will be collected in the cup and can be given again. It also forms a leg to support the bowl of the spoon, and the end of the handle B being turned down to form another leg, L, as shown, the entire spoon can be set down without any liability of spilling the medicine contained in the spoon.

The advantages derived from my invention are briefly as follows: The spoon can be easily filled, or partially filled, with the desired quantity of medicine. The patient can neither see nor smell the medicine. The spoon cannot be inserted too far in the patient's mouth. When children spit out the medicine the same is not lost, but collected, so as to be given again.

The cover C is along its edges provided with narrow downwardly-projecting flanges $i$, to make a perfectly-tight joint. On account of these flanges the cover must first be slightly raised before it is turned to either side for pouring the medicine into the bowl.

I am aware that medicine-spoons have been provided with covers having handles, by means of which such covers may be opened upward from the spoon, and such I do not claim, broadly.

Having thus fully described my invention, what I claim as new, and desire to secure by Letters Patent, is—

1. In a medicine-spoon, the combination of the spoon-bowl and a tight-fitting cover, arranged to be opened upward from the bowl, and also laterally to either side of the same to facilitate cleaning, substantially as herein specified.

2. In combination with a spoon, A B, the cover C and handle D, provided with the lugs b b, the swiveled lug d, and slotted spring F, all constructed substantially as and for the purposes herein set forth.

3. In a medicine-spoon, the curved cup I, attached to the under side of the bowl of the spoon, substantially as and for the purposes herein set forth.

In testimony that I claim the foregoing I have hereunto set my hand this 29th day of June, 1880.

THOMAS M. BAKER.

Witnesses:
H. AUBREY TOULMIN,
H. J. ENNIS.